US008980370B2

(12) United States Patent
Liu et al.

(10) Patent No.: US 8,980,370 B2
(45) Date of Patent: *Mar. 17, 2015

(54) METHOD FOR MAKING COMPOSITE CARBON NANOTUBE STRUCTURE

(75) Inventors: Kai Liu, Beijing (CN); Ying-Hui Sun, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1066 days.

This patent is subject to a terminal disclaimer.

(21) Appl. No.: 12/960,644

(22) Filed: Dec. 6, 2010

(65) Prior Publication Data

US 2011/0318485 A1 Dec. 29, 2011

(30) Foreign Application Priority Data

Jun. 29, 2010 (CN) .......................... 2010 1 0212499

(51) Int. Cl.
| | |
|---|---|
| B05D 7/00 | (2006.01) |
| B82Y 40/00 | (2011.01) |
| C08J 5/00 | (2006.01) |
| B82Y 30/00 | (2011.01) |
| C08J 3/21 | (2006.01) |
| D04H 3/002 | (2012.01) |
| D04H 3/016 | (2012.01) |

(52) U.S. Cl.
CPC .................. C08J 5/005 (2013.01); B82Y 30/00 (2013.01); C08J 3/212 (2013.01); D04H 3/002 (2013.01); D04H 3/016 (2013.01); Y10S 977/892 (2013.01)
USPC .......................................... 427/220; 977/892

(58) Field of Classification Search
CPC .............. B05D 1/36; B05D 1/18; B05D 5/00; B82Y 30/00; B82Y 40/00; Y10S 977/737; Y10S 977/742; Y10S 977/752; Y10S 977/778; Y10S 977/948
USPC ............................................ 427/220; 977/892
See application file for complete search history.

(56) References Cited

U.S. PATENT DOCUMENTS

| | | | | |
|---|---|---|---|---|
| 6,630,772 | B1 * | 10/2003 | Bower et al. | 313/311 |
| 8,187,700 | B2 * | 5/2012 | Tsotsis | 428/221 |
| 8,476,357 | B2 | 7/2013 | Liu et al. | |
| 2004/0222081 | A1 | 11/2004 | Tour et al. | |

(Continued)

FOREIGN PATENT DOCUMENTS

| | | | |
|---|---|---|---|
| CN | 101250059 | * | 8/2008 |
| CN | 101456277 | | 6/2009 |

(Continued)

OTHER PUBLICATIONS

Jiang et al. "Spinning Continuous Carbon Nanotube Yarns", Nature, 419, 801 (Oct. 24, 2002).

*Primary Examiner* — Timothy Meeks
*Assistant Examiner* — Ann Disarro
(74) *Attorney, Agent, or Firm* — Novak Druce Connolly Bove + Quigg LLP

(57) ABSTRACT

A method for making a composite carbon nanotube structure includes the following steps. An organic solvent, a polymer, and a carbon nanotube structure are provided. The polymer is dissolved in the organic solvent to obtain a polymer solution. The carbon nanotube film structure is soaked with the polymer solution. A contact angle between the organic solvent and a carbon nanotube is less than 90 degrees.

20 Claims, 17 Drawing Sheets

(56) References Cited

U.S. PATENT DOCUMENTS

| | | |
|---|---|---|
| 2006/0098389 A1* | 5/2006 | Liu et al. .................. 361/502 |
| 2007/0004081 A1* | 1/2007 | Hsiao ....................... 438/106 |
| 2009/0155467 A1* | 6/2009 | Wang et al. ............... 427/294 |
| 2009/0200517 A1* | 8/2009 | El Bounia .................. 252/500 |
| 2010/0065190 A1 | 3/2010 | Cheng et al. |
| 2010/0104808 A1 | 4/2010 | Fan et al. |

FOREIGN PATENT DOCUMENTS

| | | |
|---|---|---|
| CN | 101671442 | 3/2010 |
| CN | 101712468 | 5/2010 |
| TW | 201202319 | 1/2012 |

* cited by examiner

__US 8,980,370 B2__

1

METHOD FOR MAKING COMPOSITE CARBON NANOTUBE STRUCTURE

CROSS-REFERENCE TO RELATED APPLICATIONS

This application claims all benefits accruing under 35 U.S.C. §119 from China Patent Application No. 201010212499.4, filed on Jun. 29, 2010, in the China Intellectual Property Office, the disclosure of which is incorporated herein by reference. This application is related to commonly-assigned applications entitled, "METHOD FOR MAKING COMPOSITE CARBON NANOTUBE STRUCTURE," filed Dec. 6, 2010 Ser. No. 12/960,654, "COMPOSITE CARBON NANOTUBE STRUCTURE," filed Dec. 6, 2010 Ser. No. 12/960,655, "METHOD FOR MAKING COMPOSITE CARBON NANOTUBE STRUCTURE," filed Dec. 6, 2010 Ser. No. 12/960,658 and "COMPOSITE CARBON NANOTUBE STRUCTURE," filed Dec. 6, 2010 Ser. No. 12/960,662.

BACKGROUND

1. Technical Field

The present disclosure relates to a method for making a composite carbon nanotube structure.

2. Description of Related Art

Carbon nanotubes are tubules of carbon generally having a diameter of about 0.5 nanometers to about 100 nanometers, and composed of a number of coaxial cylinders of graphite sheets. Generally, the carbon nanotubes prepared by conventional methods are in particle or powder forms. The particle or powder-shaped carbon nanotubes limit the applications in which they can be used. Thus, preparation of macro-scale carbon nanotube structures, such as carbon nanotube wires, has attracted attention.

A carbon nanotube film having a macro-scale carbon nanotube structure, is directly drawn from a carbon nanotube array on a substrate. The carbon nanotube film includes a plurality of carbon nanotubes joined by van der Waals attractive force therebetween.

However, the carbon nanotubes of the carbon nanotube film are only joined by the van der Waals attractive force therebetween, thus a mechanical strength of the carbon nanotube film needs to be improved.

What is needed, therefore, is to provide a method for making a composite carbon nanotube structure, to overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
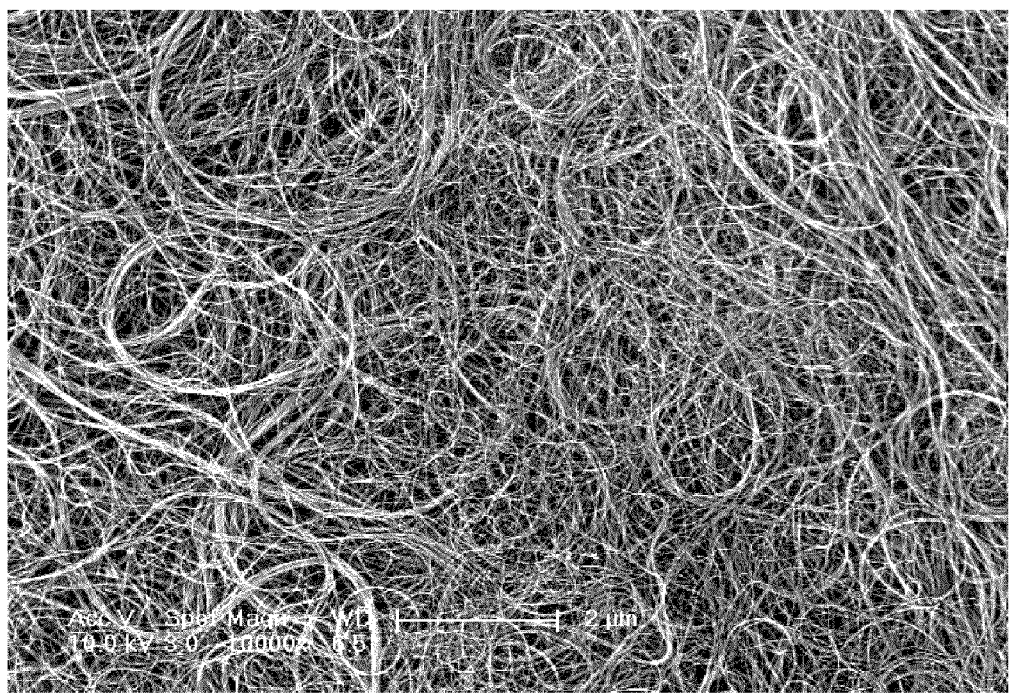
FIG. 1 shows a Scanning Electron Microscope (SEM) image of a flocculated carbon nanotube film.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A method for making a composite carbon nanotube structure of a first embodiment can include the following steps:

S10, providing an organic solvent, a polymer, and a carbon nanotube structure, wherein the carbon nanotube structure is a free-standing structure and includes a plurality of carbon nanotubes, a contact angle between the organic solvent and the carbon nanotubes being less than 90 degrees;

S20, dissolving the polymer in the organic solvent to obtain a polymer solution; and S30, soaking the carbon nanotube structure with the polymer solution.

In step S10, the carbon nanotube structure can be a planar structure, a linear structure, or other tridimensional structures. The carbon nanotube structure can be capable of forming a free-standing structure. The term "free-standing structure" can be defined as a structure that does not have to be supported by a substrate. For example, a free-standing structure can sustain the weight of itself when the free-standing structure is hoisted by a portion thereof without any significant damage to its structural integrity. The carbon nanotubes distributed in the carbon nanotube structure defines a plurality of gaps therebetween. An average gap can be in a range from about 0.2 nanometers to about 9 nanometers. The carbon nanotubes can have a significant van der Waals attractive force therebetween. The free-standing structure of the carbon nanotube structure is realized by the carbon nanotubes joined by van der Waals attractive force. So, if the carbon nanotube structure is placed between two separate supporters, a portion of the carbon nanotube structure, not in contact with the two supporters, would be suspended between the two supporters and yet maintain film structural integrity.

The carbon nanotube structure can include a carbon nanotube film structure. The carbon nanotubes in the carbon nanotube film structure can be orderly or disorderly arranged. If the carbon nanotube structure includes a plurality of carbon nanotube film structures stacked together, adjacent carbon nanotube film structures can only be adhered by van der Waals attractive force therebetween.

The term 'disordered carbon nanotube film structure' includes, but is not limited to, a structure where the carbon nanotubes are arranged along many different directions such that the number of carbon nanotubes arranged along each different direction can be almost the same (e.g. uniformly disordered), and/or entangled with each other. 'Ordered carbon nanotube film structure' includes, but is not limited to, a structure where the carbon nanotubes are arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube film structure can be single-walled, double-walled, and/or multi-walled carbon nanotubes.

Macroscopically, the carbon nanotube film structure may have a substantially planar structure. The planar carbon nanotube structure can have a thickness of about 0.5 nanometers to about 100 microns. The carbon nanotube film structure includes a plurality of carbon nanotubes and defines a plurality of micropores having a size of about 1 nanometer to about 500 nanometers. The carbon nanotube film structure includes at least one carbon nanotube film, the at least one carbon nanotube film including a plurality of carbon nanotubes substantially parallel to a surface of the corresponding carbon nanotube film.

The carbon nanotube film structure can include a flocculated carbon nanotube film as shown in FIG. 1. The flocculated carbon nanotube film can include a plurality of long, curved, disordered carbon nanotubes entangled with each other and can form a free-standing structure. Further, the flocculated carbon nanotube film can be isotropic. The carbon nanotubes can be substantially uniformly dispersed in the carbon nanotube film. The adjacent carbon nanotubes are acted upon by the van der Waals attractive force therebetween, thereby forming an entangled structure with micropores defined therein. Alternatively, the flocculated carbon nanotube film is very porous. Sizes of the micropores can be about 1 nanometer to about 500 nanometers. Further, due to the carbon nanotubes in the carbon nanotube structure being entangled with each other, the carbon nanotube structure employing the flocculated carbon nanotube film has excellent durability and can be fashioned into desired shapes with a low risk to the integrity of the carbon nanotube structure. The flocculated carbon nanotube film, in some embodiments, will not require the use of a structural support due to the carbon nanotubes being entangled and adhered together by van der Waals attractive force therebetween. The flocculated carbon nanotube film can define a plurality of micropores having a diameter of about 1 nanometer to about 500 nanometers. The micropores defined in the flocculated carbon nanotube film can improve a special surface area of the flocculated carbon nanotube film. More polymer solution can be accommodated in the flocculated carbon nanotube film.

Figure 2:
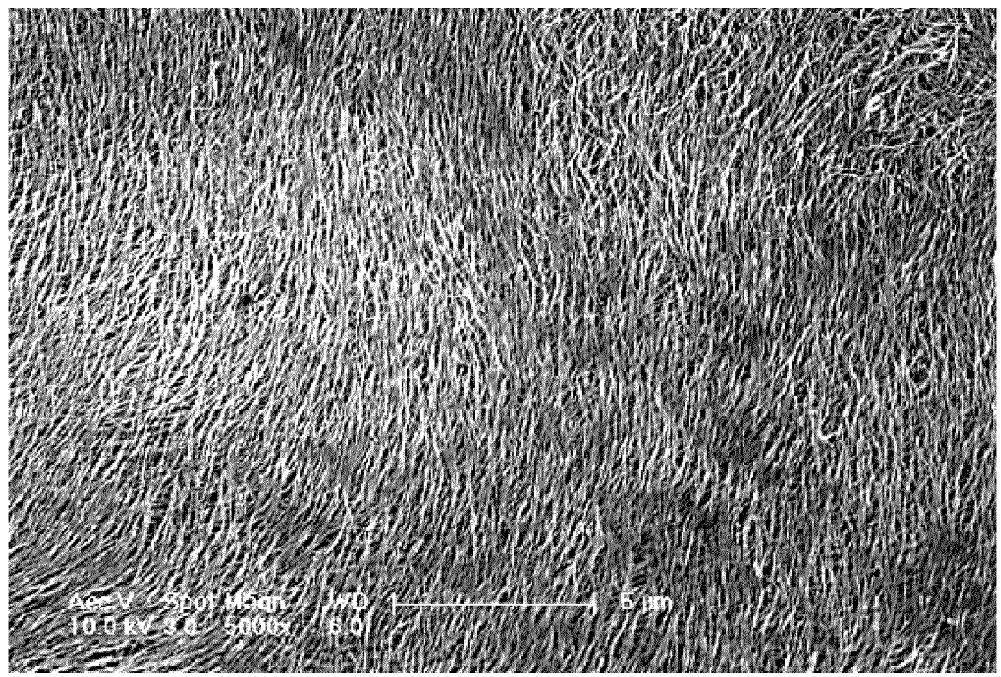
FIG. 2 shows an SEM image of a pressed carbon nanotube film.

The carbon nanotube film structure can include a pressed carbon nanotube film. The carbon nanotubes in the pressed carbon nanotube film can be arranged along a same direction or arranged along different directions. The carbon nanotubes in the pressed carbon nanotube film can rest upon each other. The adjacent carbon nanotubes are combined and attracted to each other by van der Waals attractive force, and can form a free-standing structure. An angle between a primary alignment direction of the carbon nanotubes and a surface of the pressed carbon nanotube film can be in an range from approximately 0 degrees to approximately 15 degrees. The pressed carbon nanotube film can be formed by pressing a carbon nanotube array. The angle is closely related to pressure applied to the carbon nanotube array. The greater the pressure, the smaller the angle. The carbon nanotubes in the carbon nanotube film is substantially parallel to the surface of the carbon nanotube film if the angle is about 0 degrees. A length and a width of the carbon nanotube film can be set as desired. The pressed carbon nanotube film can include a plurality of carbon nanotubes substantially aligned along one or more directions. The pressed carbon nanotube film can be obtained by pressing the carbon nanotube array with a pressure head. Alternatively, the shape of the pressure head and the pressing direction can determine the direction of the carbon nanotubes arranged therein. Specifically, in one embodiment, a planar pressure head is used to press the carbon nanotube array along the direction substantially perpendicular to a substrate. A plurality of carbon nanotubes pressed by the planar pressure head may be sloped in many directions. In another embodiment, as shown in FIG. 2, if a roller-shaped pressure head is used to press the carbon nanotube array along a certain direction, the pressed carbon nanotube film having a plurality of carbon nanotubes substantially aligned along the certain direction can be obtained. In another embodiment, if the roller-shaped pressure head is used to press the carbon nanotube array along different directions, the pressed carbon nanotube film having a plurality of carbon nanotubes substantially aligned along different directions can be obtained. The pressed carbon nanotube film can define a plurality of micropores having a diameter of about 1 nanometer to about 500 nanometers. The micropores defined in the pressed carbon nanotube film can improve a special surface area of the pressed carbon nanotube film. More polymer solution can be accommodated in the flocculated carbon nanotube film.

Figure 3:
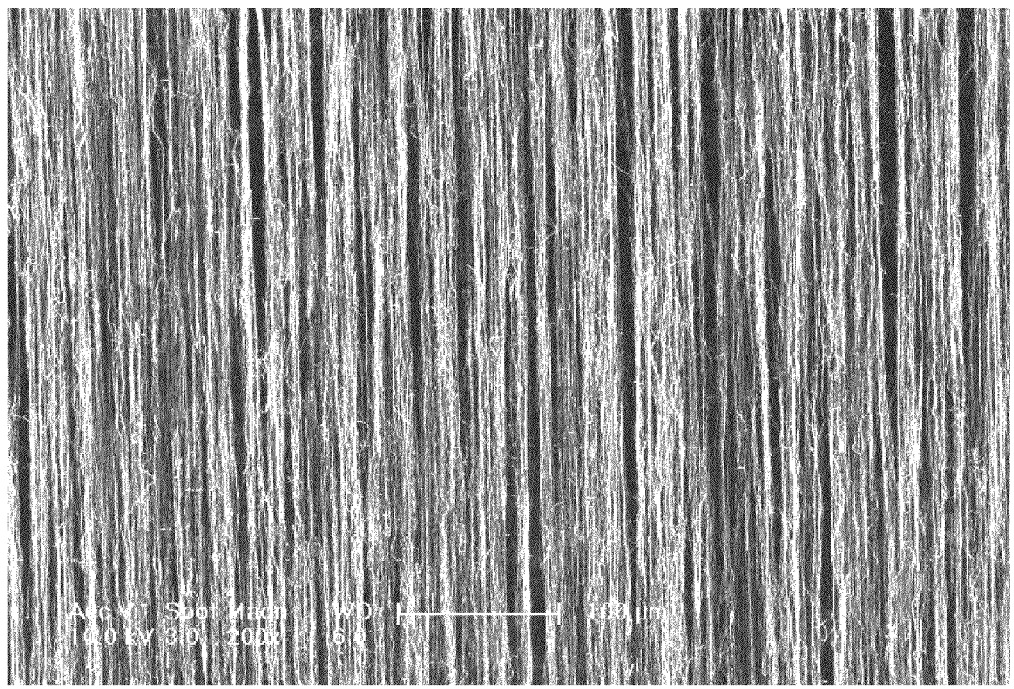
FIG. 3 shows an SEM image of a drawn carbon nanotube film.

In some embodiments, the carbon nanotube film structure includes at least one drawn carbon nanotube film as shown in FIG. 3. The drawn carbon nanotube film can have a thickness of about 0.5 nanometers to about 100 microns. The drawn carbon nanotube film includes a plurality of carbon nanotubes that can be arranged substantially parallel to a surface of the drawn carbon nanotube film. A plurality of micropores having a size of about 1 nanometer to about 500 nanometers can be defined by the carbon nanotubes. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. More specifically, the drawn carbon nanotube film includes a plurality of successively oriented carbon nanotube segments joined end-to-end by van der Waals attractive force therebetween. Each carbon nanotube segment includes a plurality of carbon nanotubes substantially parallel to each other and joined by van der Waals attractive force therebetween. The carbon nanotube segments can vary in width, thickness, uniformity, and shape. A small number of the carbon nanotubes are randomly arranged in the drawn carbon nanotube film and has a small if not negligible effect on the larger number of the carbon nanotubes in the drawn carbon nanotube film arranged substantially along the same direction.

Understandably, some variation can occur in the orientation of the carbon nanotubes in the drawn carbon nanotube film as can be seen in FIG. 3. Microscopically, the carbon nanotubes oriented substantially along the same direction may not be perfectly aligned in a straight line, and some curve portions may exist. Furthermore, it can be understood that some carbon nanotubes are located substantially side by side and oriented along the same direction and in contact with each other.

Figure 4:
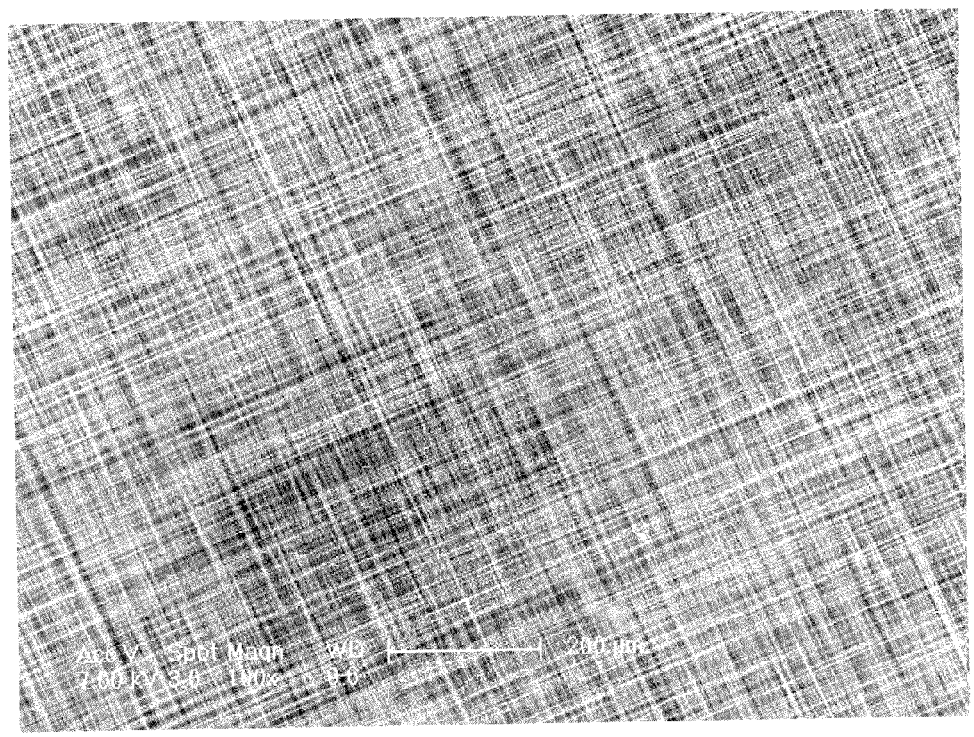
FIG. 4 shows an SEM image of a carbon nanotube structure consisting of a plurality of stacked drawn carbon nanotube films.

The carbon nanotube film structure can include a plurality of stacked drawn carbon nanotube films. Adjacent drawn carbon nanotube films can be adhered by only the van der Waals attractive force therebetween. An angle can exist between the carbon nanotubes in adjacent drawn carbon nanotube films. The angle between the aligned directions of the adjacent drawn carbon nanotube films can range from 0 degrees to about 90 degrees. In one embodiment, the angle between the aligned directions of the adjacent drawn carbon nanotube films is substantially 90 degrees as shown in FIG. 4. Simultaneously, aligned directions of adjacent drawn carbon nanotube films can be substantially perpendicular to each other, thus a plurality of micropores and nodes can be defined by the carbon nanotube film structure. The carbon nanotube film structure including a plurality of uniform micropores and nodes can form a nanoporous structure. The nanoporous structure can provide a huge surface area to adsorb more polymer solution therein.

The carbon nanotube structure can include a carbon nanotube wire. The carbon nanotube wire can include a plurality of carbon nanotubes joined end to end by van der Waals attractive force therebetween along an axial direction. The carbon nanotube structure can include a plurality of carbon nanotube wires. The carbon nanotube wires can be substantially parallel to each other to form a bundle-like structure or twisted with each other to form a twisted structure. The plurality of carbon nanotube wires can also be woven together to form a woven structure. The bundle-like structure, the twisted structure, and the woven structure are three kinds of linear shaped carbon nanotube structure.

Figure 5:
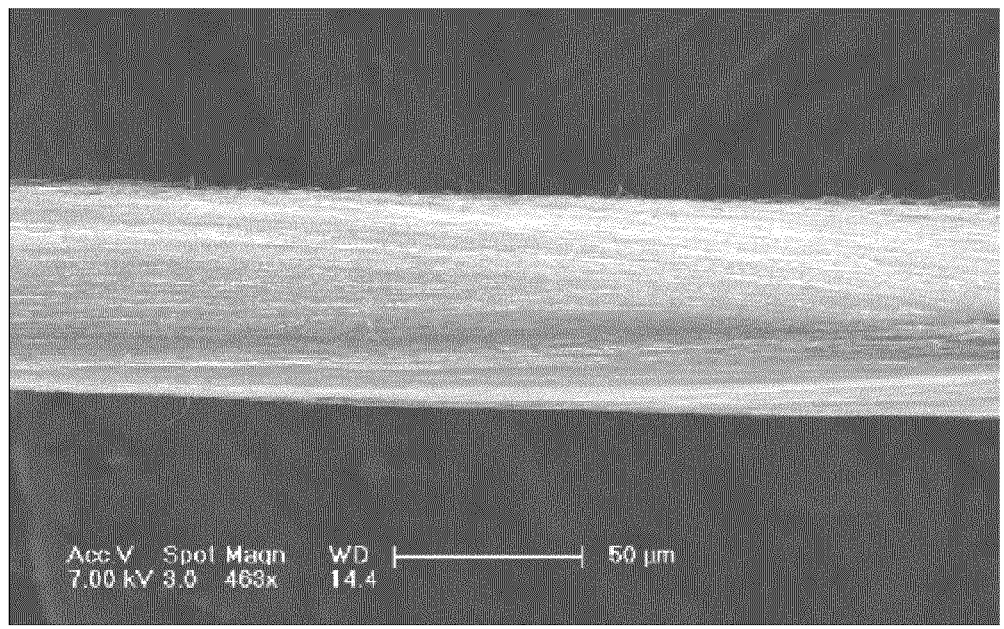
FIG. 5 shows an SEM image of an untwisted carbon nanotube wire.

The carbon nanotube wire can be untwisted or twisted. Treating the drawn carbon nanotube film with a volatile solvent can obtain the untwisted carbon nanotube wire. In one embodiment, the volatile solvent can be applied to soak the entire surface of the drawn carbon nanotube film. During the soaking, adjacent substantially parallel carbon nanotubes in the drawn carbon nanotube film will bundle together due to the surface tension of the volatile solvent as it volatilizes, and thus the drawn carbon nanotube film will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire) as shown in FIG. 5. The carbon nanotubes are substantially parallel to the axis of the untwisted carbon nanotube wire. In one embodiment, the untwisted carbon nanotube wire includes a plurality of successive carbon nanotubes joined end to end by van der Waals attractive force therebetween. The length of the untwisted carbon nanotube wire can be arbitrarily set as desired. A diameter of the untwisted carbon nanotube wire ranges from about 0.5 nanometers to about 100 micrometers.

Figure 6:
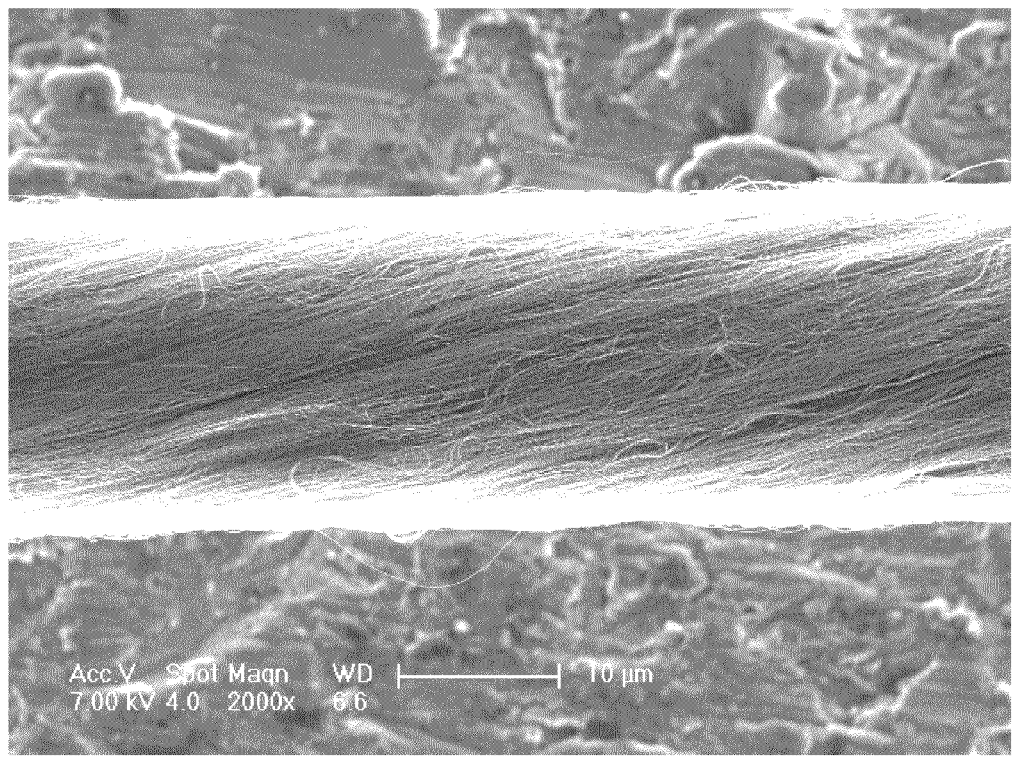
FIG. 6 shows a low magnification SEM image of a twisted carbon nanotube wire defined as CNT wire.

The twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire as shown in FIG. 6. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can be from about 0.5 nanometers to about 100 micrometers.

The organic solvent can be polyacrylonitrile, polyvinyl alcohol (PVA), polypropylene (PP), polystyrene (PS), polyvinylchloride (PVC), polyethylene terephthalate (PET), or combinations thereof. A kind and a polymerization degree of the polymer are not limited provided the polymer can be dissolved in the organic solvent. The greater the degree of polymerization, the greater the mechanical strength of the polymer and the less a solubility of the polymer. In one embodiment, the polymer is PVA, having a polymerization degree from about 1500 to about 3500.

The organic solvent is configured to dissolve the polymer therein and soak the carbon nanotube structure. The contact angle between the organic solvent and the carbon nanotubes can be less than 90 degrees, thus the polymer solution can even soak inner surfaces of the carbon nanotubes. The contact angle is the angle at which a liquid interface meets a solid surface. The contact angle is also a quantitative measure of a wetting of the solid by the liquid. Wettability between the organic solvent and the carbon nanotubes can be determined by the contact angle between the organic solvent and the carbon nanotubes. The less the contact angle, the better the soakage capability of the organic solvent and the better the wettability between the organic solvent and the carbon nanotubes. In one embodiment, the contact angle is less than 70 degrees. The organic solvent can have a surface tension greater than 20 millimeters per newton, thus, the organic solvent can shrink the carbon nanotube structure soaked therein. The greater the surface tension, the greater a shrinking strength of the organic solvent and the polymer solution, and the tighter the polymer adhering to the carbon nanotube structure. In one embodiment, the surface tension of the organic solvent is greater than or equal to about 40 millimeters per newton. The organic solvent can be dimethyl sulphoxide (DMSO), dimethyl formamide (DMF), 2, 5-dimethyl furan, or combinations thereof. In one embodiment, the polymer is PVA and the organic solvent is DMSO. The contact angle between the DMSO and the carbon nanotubes is about 70 degrees. The surface tension of the DMSO is about 43.54 millimeters per newton.

In step S20, a mass ratio between the polymer and the polymer solution can be moderate, thus more polymer in the polymer solution can infiltrate into intertube spaces inside the carbon nanotube structure. The intertube spaces can include spaces defined among the carbon nanotubes and spaces defined by the inner surfaces of the carbon nanotubes. In one embodiment, the organic solvent is DMSO, the polymer is PVA, and the mass ratio between the PVA and the polymer solution is in a range from about 1 percent to about 9 percent.

In step S30, if the carbon nanotube structure is soaked by the polymer solution, the organic solvent will wet the carbon nanotube structure. The polymer loaded by the organic solvent can infiltrate into the intertube spaces in the carbon nanotube structure and integrate with the carbon nanotube structure firmly. The carbon nanotubes can be joined by the polymer and the van der Waals attractive force therebetween at the same time. A mechanical strength of the carbon nanotube structure can be improved. A composite carbon nanotube structure can be obtained by compositing the carbon nanotube structure and the polymer. In the composite carbon nanotube structure, the intertube spaces in the carbon nanotube structure can be reduced by filling the polymer. The organic solvent can play an important role to obtain a composite carbon nanotube structure having a greater mechanical strength. The less the contact angle between the organic solvent, the more the polymer infiltrates into the intertube spaces, the firmer the polymer adheres to the carbon nanotubes, and the greater the mechanical strength of the composite carbon nanotube structure.

A shrinking effect of the organic solvent can also reduce the intertube spaces in the carbon nanotube structure. A volume of the composite carbon nanotube structure can be less than a volume of the carbon nanotube structure. A density of the composite carbon nanotube structure can be greater than a density of the carbon nanotube structure. A mechanical strength of the composite carbon nanotube structure can be greater than a mechanical strength of the carbon nanotube structure. The greater the surface tension, the greater the density of the composite carbon nanotube structure, and the greater the mechanical strength of the composite carbon nanotube structure.

The method for making the composite carbon nanotube structure can further include a step of vaporizing the organic solvent from the composite carbon nanotube structure composited by the polymer and the carbon nanotube structure. The means for vaporizing the organic solvent is not limited, provided the organic solvent in the carbon nanotube structure is vaporized, and the polymer and the carbon nanotubes are not oxidized. When the organic solvent in the carbon nanotube structure is vaporized, a mass ratio between the polymer in the composite carbon nanotube structure and the composite carbon nanotube structure can be in range from about 2.5 percent to about 21.5 percent.

A method for making a composite carbon nanotube structure of a second embodiment can include the following steps:

S210, providing an organic solvent, a pre-polymer, and a carbon nanotube structure, wherein the carbon nanotube structure is a free-standing structure and includes a plurality of carbon nanotubes, a contact angle between the organic solvent and the carbon nanotubes being less than 90 degrees;

S220, dissolving the pre-polymer in the organic solvent to obtain a polymer solution;

S230, soaking the carbon nanotube structure with the pre-polymer solution; and

S240, polymerizing the pre-polymer infiltrated into the carbon nanotube structure to obtain a polymer.

The steps, features, and functions of the method of the second embodiment are similar to the method of the first embodiment. The difference is that the polymer infiltrated into the intertube spaces of the carbon nanotube structure is polymerized by the pre-polymer infiltrated into the intertube spaces.

A molecular weight of the pre-polymer can be less than a molecular weight of the polymer. A solubility of the pre-polymer in the organic solvent can be greater than a solubility of the polymer in the organic solvent. If the pre-polymer and the polymer are dissolved in the organic solvent, a mass ratio between the pre-polymer and the pre-polymer solution can be greater than a mass ratio between the polymer polymerized by the pre-polymer and a polymer solution. If the carbon nanotube structure is soaked by the pre-polymer solution and the polymer solution, more pre-polymer can be infiltrated into the intertube spaces than the polymer infiltrated into the intertube spaces. When the pre-polymer infiltrated into the intertube spaces is polymerized into the polymer, the composite carbon nanotube structure would be obtained. A mass ratio between the polymer and the composite carbon nanotube structure of the second embodiment can be greater than a mass ratio between the polymer and the composite carbon nanotube structure of the first embodiment.

Figure 7:
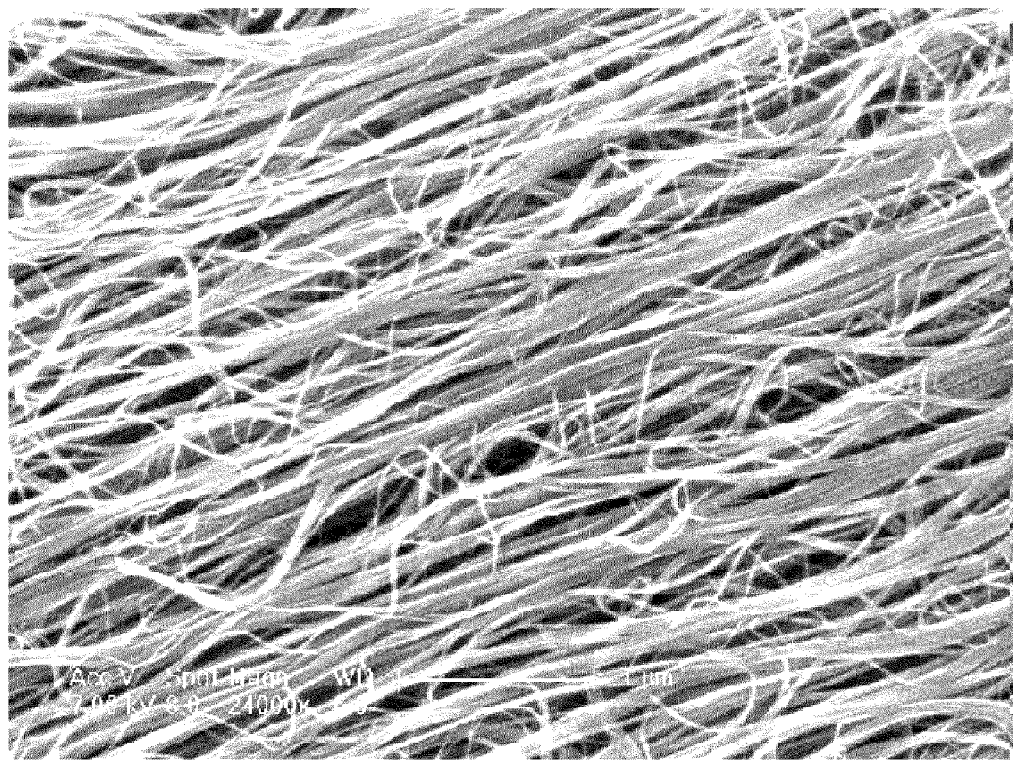
FIG. 7 shows a high magnification SEM image of the CNT wire in FIG. 6.
Figure 8:
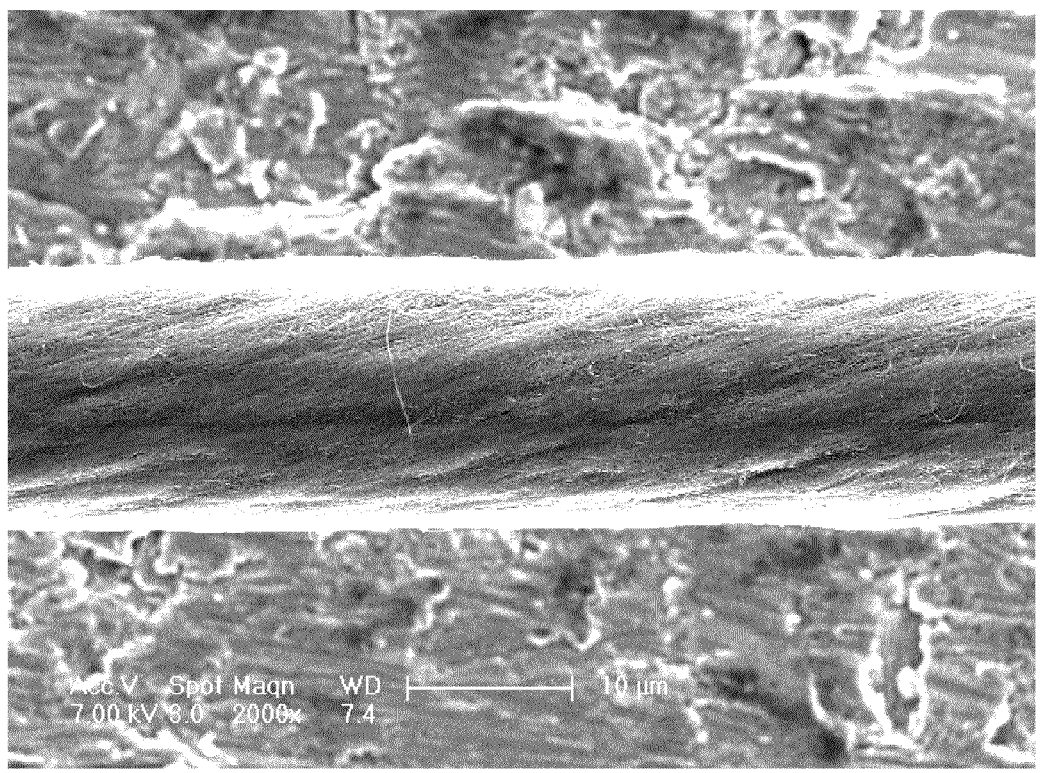
FIG. 8 shows a low magnification SEM image of a shrinking CNT wire.
Figure 9:
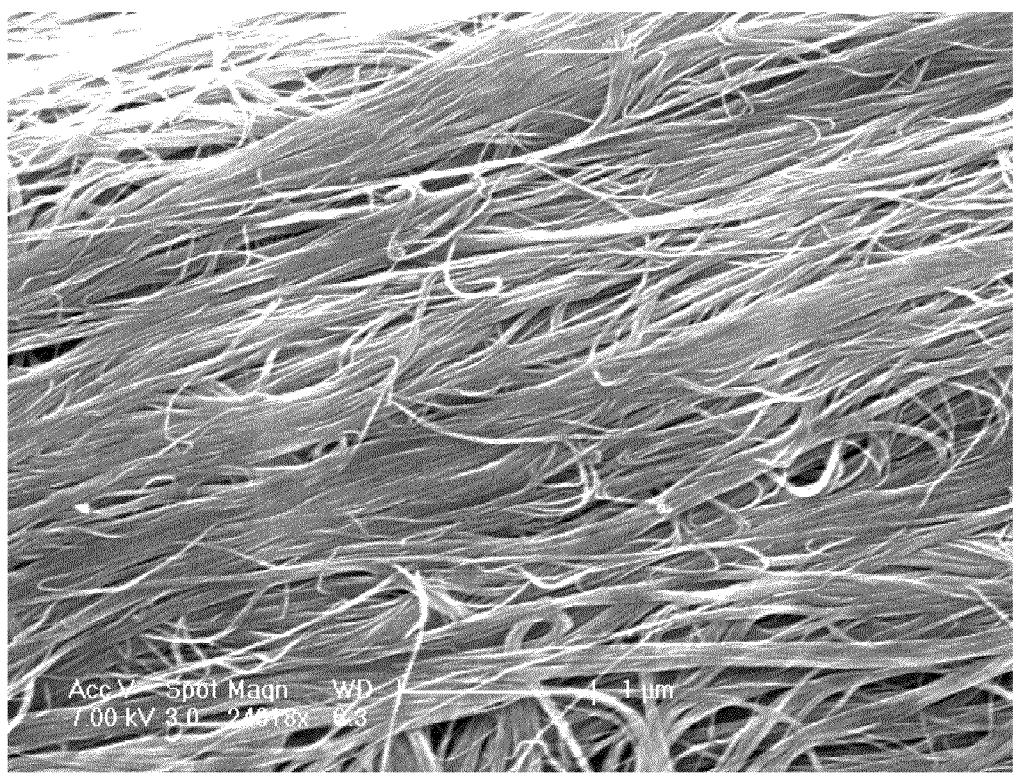
FIG. 9 shows a high magnification SEM image of the shrinking CNT wire in FIG. 8.

To study and compare properties of the composite carbon nanotube structure and the carbon nanotube structure, a twisted carbon nanotube wire as shown in FIG. 6 and FIG. 7, can be provided and defined as a CNT wire. The CNT wire can be treated with a volatile solvent to obtain a shrinking CNT wire as shown in FIG. 8 and FIG. 9. The volatile solvent can be applied to soak the entire surface of CNT wire. During the soaking, adjacent carbon nanotubes in the CNT wire will bundle together, due to the surface tension of the volatile solvent as it volatilizes.

Figure 10:
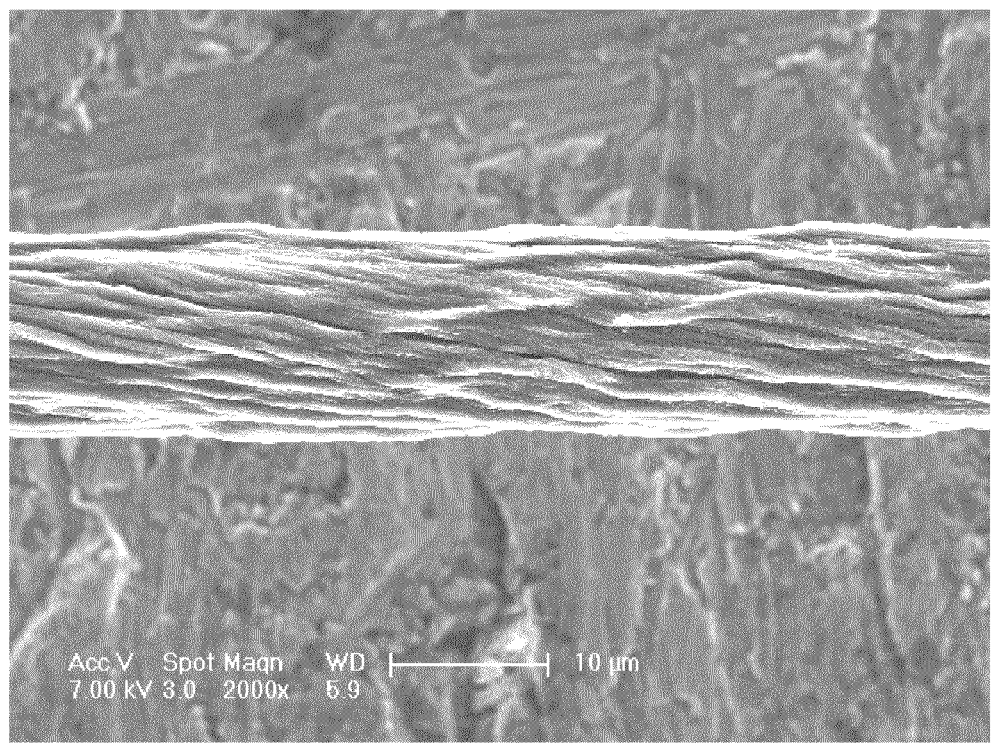
FIG. 10 shows a low magnification SEM image of a composite CNT wire.
Figure 11:
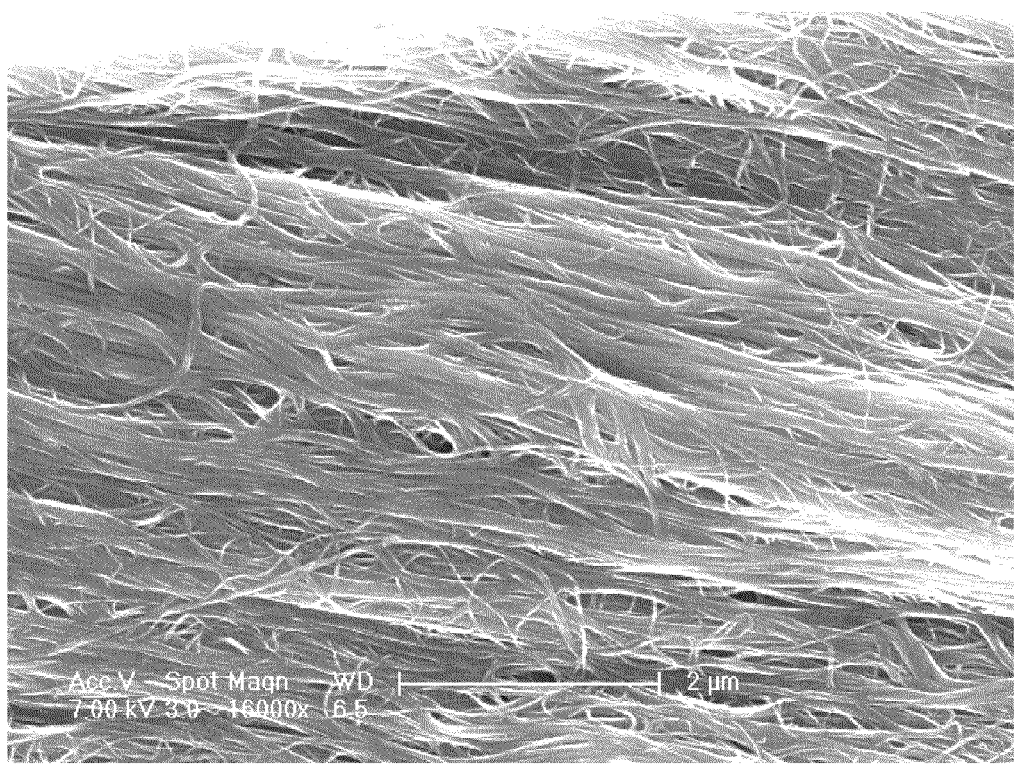
FIG. 11 shows a high magnification SEM image of the composite CNT wire in FIG. 10.

Referring to FIG. 10 and FIG. 11, a composite carbon nanotube wire can be made by soaking the CNT wire into a polymer solution. The composite carbon nanotube wire can be defined as a composite CNT wire. The polymer solution can include PVA and DSMO. The PVA dissolving in the DMSO can have a polymerization degree of about 1750 to about 3300. The contact angle between the DMSO and the carbon nanotubes is about 70 degrees. The surface tension of the DMSO is about 43.54 millimeters per newton. A mass ratio between the PVA and the polymer solution is from about 1 percent to about 9 percent. In one embodiment, the mass ratio is about 5 percent. If the mass ratio is about 5 percent, the composite CNT wire can be filled with more PVA, and be shrunk by the polymer solution more evidently.

Figure 12:
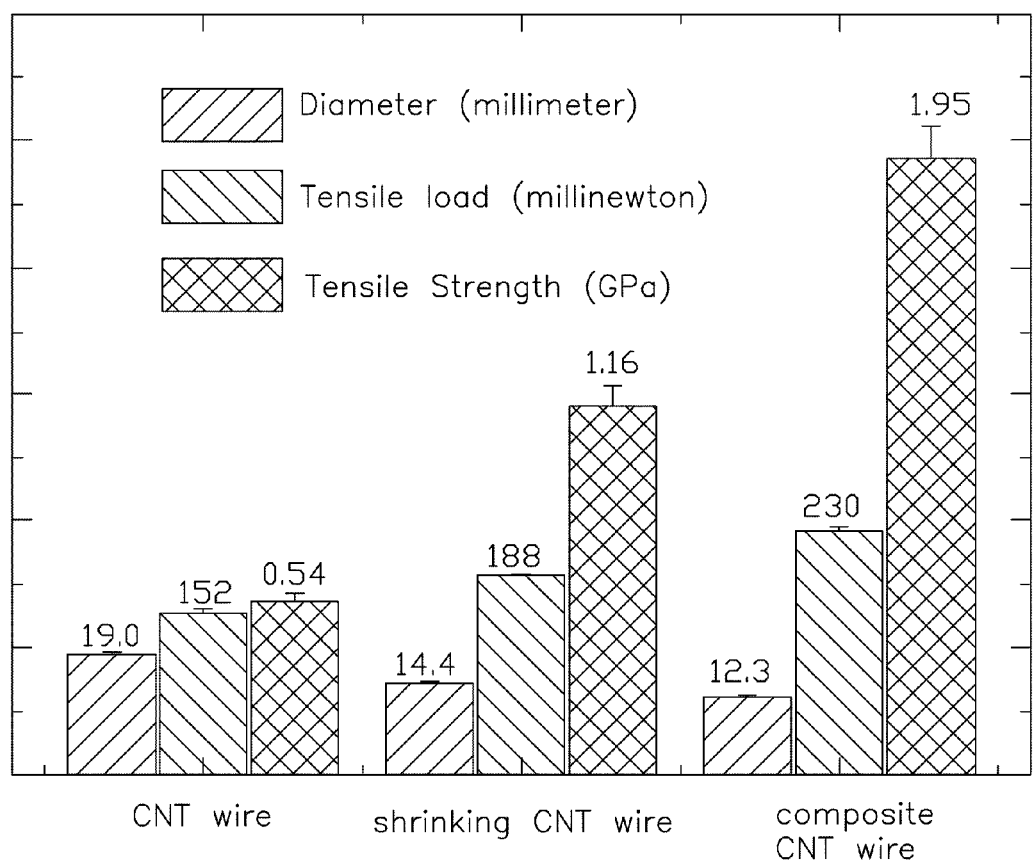
FIG. 12 shows a comparison of diameters, tensile strengths, and tensile loads of the CNT wire in FIG. 6, the shrinking CNT wire in FIG. 8, and the composite CNT wire in FIG. 10.
Figure 13:
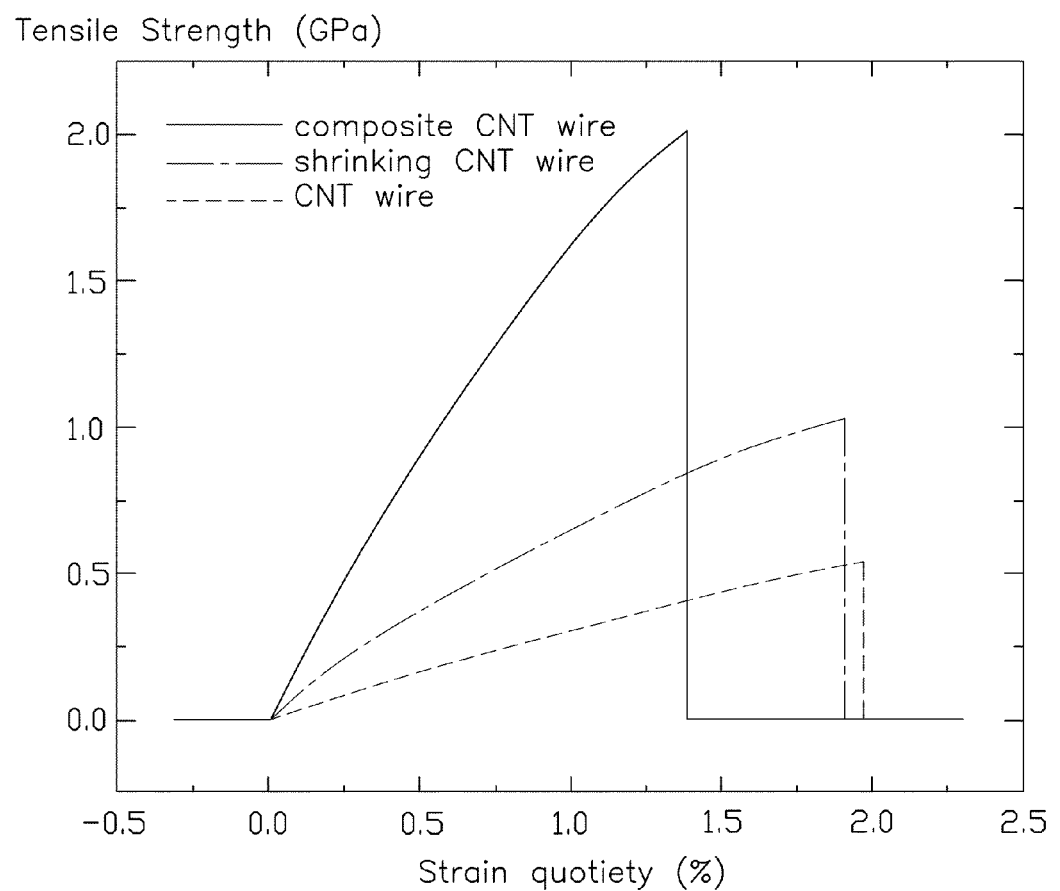
FIG. 13 shows a comparison of tensile strengths of the CNT wire in FIG. 6, the shrinking CNT wire in FIG. 8, and the composite CNT wire in FIG. 10, if the three wires have a determined strain quotiety.

Referring to FIG. 12, diameters, tensile strengths, and tensile loads of the CNT wire, the shrinking CNT wire, and the composite CNT wire are recorded. The tensile strengths and tensile loads are measured along axis directions of the three wires. A shrinking effect of the polymer solution can decrease the diameter of the composite CNT wire, thus the diameter of the composite CNT wire can be less than the diameter of the CNT wire. The shrinking effect of the polymer solution is stronger than a shrinking effect of the volatile solvent, thus the diameter of the composite CNT wire can be less than the diameter of the shrinking CNT wire. The PVA loaded by the DMSO can infiltrate into intertube spaces defined among carbon nanotubes of the CNT wire and firmly integrate with the carbon nanotubes. The carbon nanotubes of the composite CNT wire can be joined by the polymer and van der Waals attractive force therebetween at the same time. The tensile strength of the composite CNT wire can be greater than the tensile strengths of the shrinking CNT wire and the CNT wire. The tensile load of the composite CNT wire can be greater than the tensile loads of the shrinking CNT wire and the CNT wire. Referring to FIG. 13, tensile strengths of the three wires can be recorded when the three wires have a determined strain quotiety. The tensile strength of the composite CNT wire can be greater than the tensile strengths of the shrinking CNT wire and the CNT wire.

Figure 14:
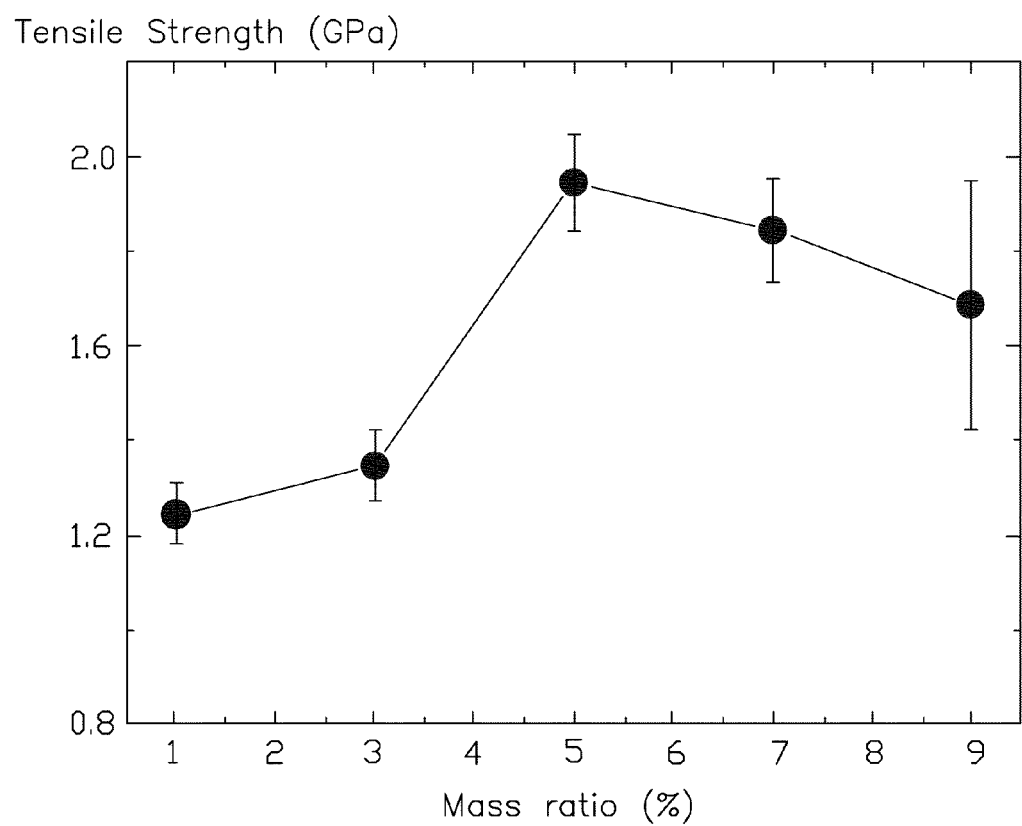
FIG. 14 shows a comparison of the tensile strengths of the composite CNT wires soaked with different polymer solutions.

Referring to FIG. 14, the tensile strengths of the composite CNT wires soaked with different polymer solutions can be recorded. Mass ratios between the PVA and polymer solutions can be in a range from about 1 percent to about 9 percent. All the tensile strengths of the composite CNT wires can be greater than about 1.2 GPa. If the mass ratio between the PVA and the polymer solution is about 5 percent, the composite CNT wire can obtain the greatest tensile strength of about 2.0 GPa.

Figure 15:
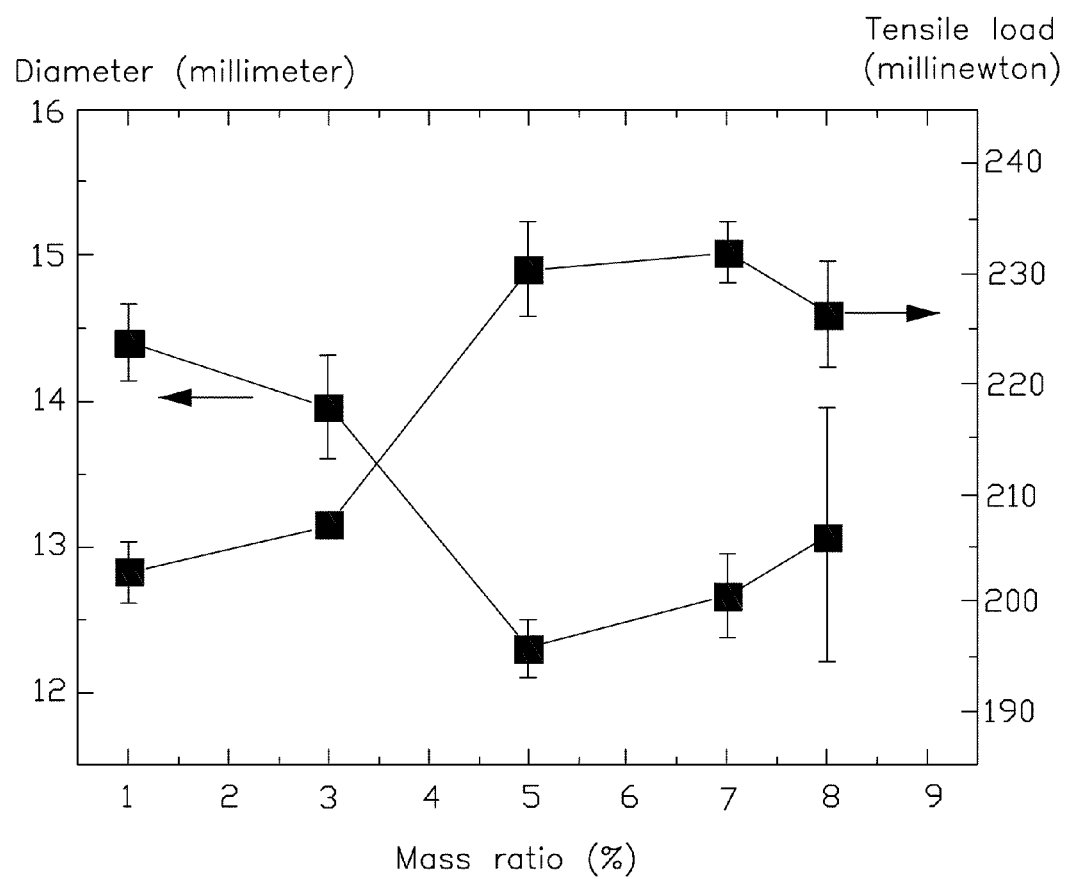
FIG. 15 shows a comparison of the tensile loads and the diameters of the composite CNT wires soaked with different polymer solutions.

Referring to FIG. 15, the tensile loads and the diameters of the composite CNT wires soaked with different polymer solutions can be recorded. The mass ratios between the PVA and polymer solutions can be in a range from about 1 percent to about 9 percent. All the diameters of the composite CNT wires can be less than 14.5 micrometers. If the mass ratio between the PVA and the polymer solution is about 5 percent, the composite CNT wire can obtain a diameter of about 12.2 micrometers. All the tensile loads of the composite CNT wires can be greater than 200 millinewtons. When the mass ratio between the PVA and polymer solution is about 5 percent, the composite CNT wire can obtain the greatest tensile load of about 233 millinewtons.

Figure 16:
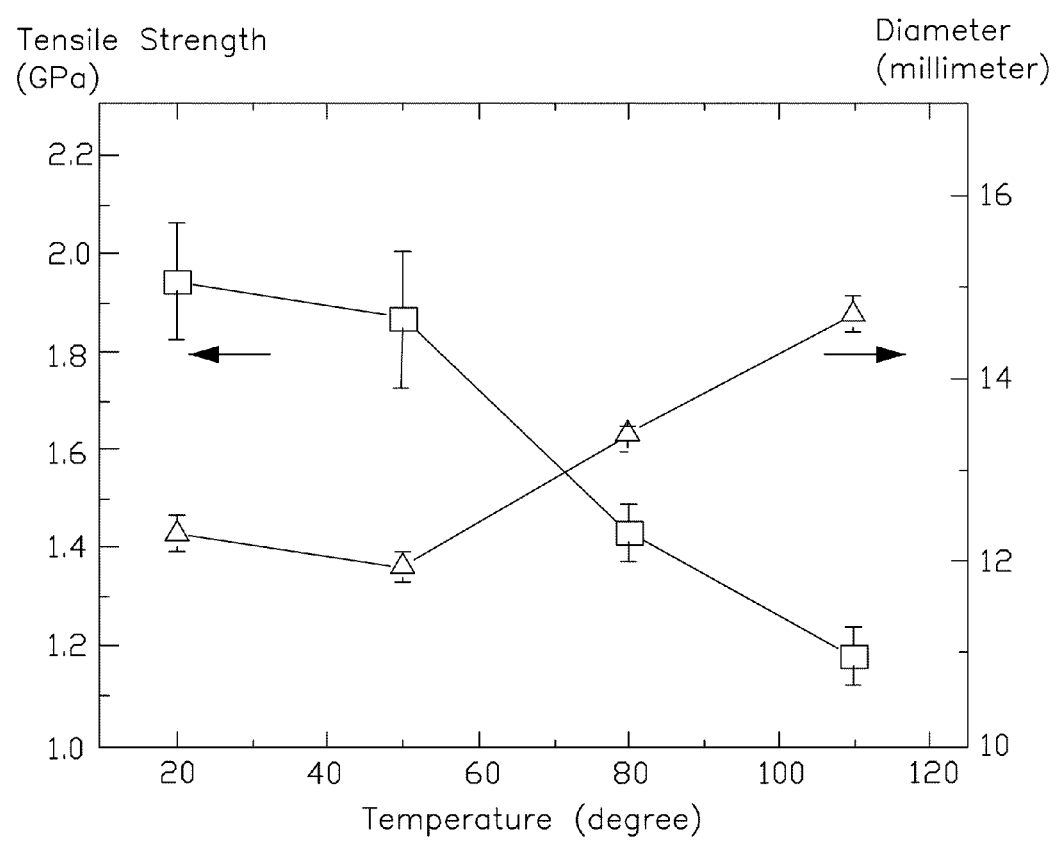
FIG. 16 shows a comparison of the tensile strengths and the diameters of the composite CNT wires soaked with different polymer solutions.

Referring to FIG. 16, the tensile strengths and the diameters of the composite CNT wires soaked with different polymer solutions can be recorded. Temperatures of the polymer solutions can be in a range from about 20 degrees to about 120 degrees. If the temperature of the polymer solution is greater than 50 degrees, the greater the temperature, the greater the diameter, and the less the tensile strength. If the temperature of the polymer solution is less than 50 degrees, the diameter and the tensile strength can remain changeless, and thus, the method for making the composite CNT wire can be taken in a moderate condition.

Figure 17:
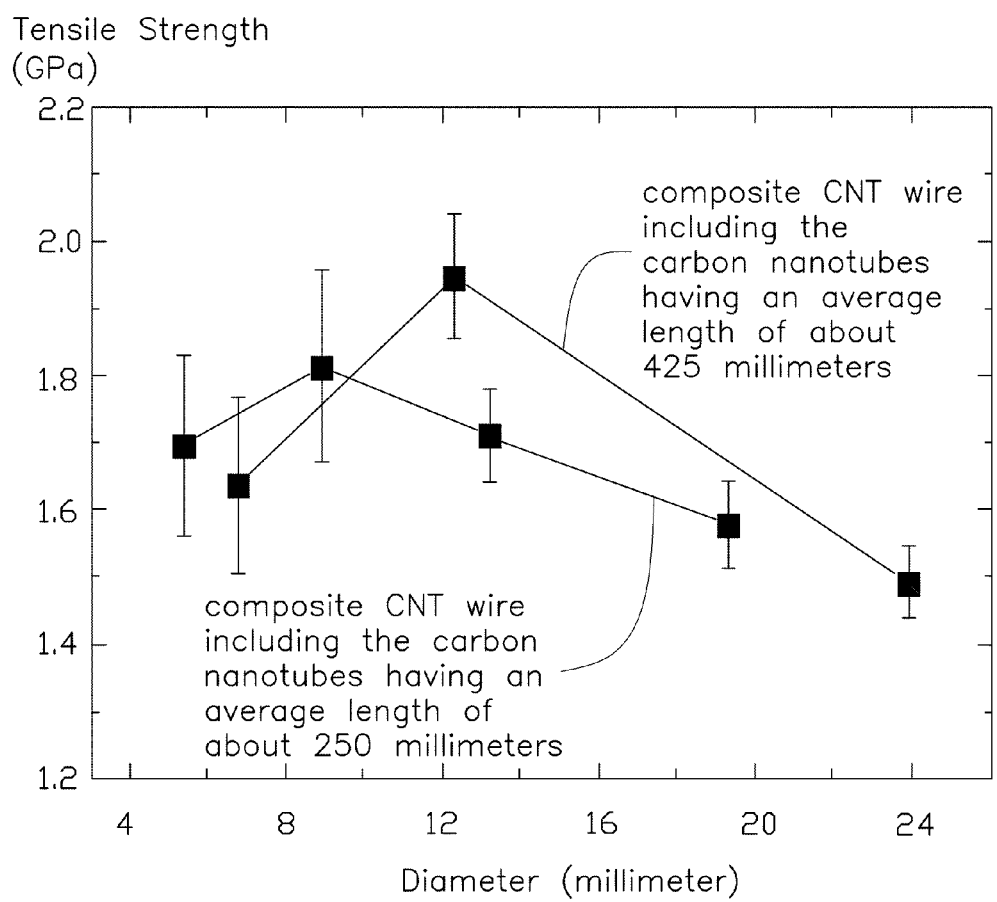
FIG. 17 shows a comparison of the tensile strengths of the composite CNT wires having different carbon nanotubes.

Referring to FIG. 17, the tensile strengths of the composite CNT wires having different carbon nanotubes can be recorded. The average lengths of the carbon nanotubes can be about 425 millimeters or about 250 millimeters. All the tensile strengths of the composite CNT wires can be greater than 1.5 GPa, even if the lengths of carbon nanotubes of the composite CNT wire and the diameters of the composite CNT wires are different from each other.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A method for making a composite carbon nanotube structure, comprising:
    providing an organic solvent and a polymer;
    dissolving the polymer in the organic solvent to obtain a polymer solution; and
    applying a carbon nanotube film structure in the polymer solution to composite the polymer and the carbon nanotube film structure, wherein the carbon nanotube film structure is a free-standing structure while in the polymer solution and comprises a plurality of carbon nanotubes, and the plurality of carbon nanotubes are substantially parallel to a surface of the carbon nanotube film structure, a contact angle between the organic solvent and the carbon nanotubes being less than 90 degrees.

2. The method of claim 1, wherein the contact angle between the solvent and the carbon nanotubes is less than or equal to 70 degrees.

3. The method of claim 1, wherein the organic solvent has a surface tension greater than or equal to about 20 millimeters per newton.

4. The method of claim 3, wherein the surface tension of the organic solvent is greater than or equal to about 40 millimeters per newton.

5. The method of claim 1, wherein the organic solvent is selected from the group consisting of dimethyl sulphoxide, dimethyl formamide, 2,5-dimethyl furan, and combinations thereof.

6. The method of claim 1, wherein the polymer is selected from the group consisting of polyacrylonitrile, polyvinyl alcohol, polypropylene, polystyrene, polyvinylchlorid, polyethylene terephthalate, and combinations thereof.

7. The method of claim 1, wherein the polymer is polyacrylonitrile, the organic solvent is dimethyl sulphoxide, and a mass ratio between the polyacrylonitrile and the dimethyl sulphoxide is from about 1 percent to about 9 percent.

8. The method of claim 7, wherein a polymerization degree of the polyacrylonitrile is in a range from about 1750 to about 3300.

9. The method of claim 1, wherein the carbon nanotube film structure comprises a carbon nanotube film, the carbon nanotubes of the carbon nanotube film are substantially parallel to a surface of the carbon nanotube film.

10. The method of claim 9, wherein the carbon nanotube film is isotropic, and the carbon nanotubes of the carbon nanotube film are entangled with each other.

11. The method of claim 9, wherein the carbon nanotubes of the carbon nanotube film are substantially aligned in a single direction.

12. The method of claim 9, wherein the carbon nanotube film comprises a plurality of successively oriented carbon nanotube segments joined end-to-end by van der Waals attractive force therebetween, and the carbon nanotubes of each carbon nanotube segment are substantially parallel to each other and joined by van der Waals attractive force therebetween.

13. The method of claim 1, wherein the carbon nanotube film structure comprises a plurality of stacked carbon nanotube films adhered by only the van der Waals attractive force therebetween.

14. The method of claim 1, further comprising vaporizing the organic solvent from the composite carbon nanotube structure composited by the polymer and the carbon nanotube structure.

15. The method of claim 14, wherein a mass ratio between the polymer and the composite carbon nanotube structure containing the polymer is in a range from about 2.5 percent to about 21.5 percent.

16. The method of claim 1, wherein the polymer is infiltrated into intertube spaces defined in the carbon nanotube film structure.

17. The method of claim 16, wherein the intertube spaces comprise spaces defined among the carbon nanotubes and spaces defined by inner surfaces of the carbon nanotubes.

18. A method for making a composite carbon nanotube structure, comprising:
    providing an organic solvent, a pre-polymer, and a carbon nanotube structure, the carbon nanotube film structure being a free-standing structure and comprising a plurality of carbon nanotubes, and the carbon nanotube film structure comprises a planar surface, the plurality of carbon nanotubes are substantially parallel to the planor surface, a contact angle between the organic solvent and the carbon nanotubes being less than 90 degrees;

dissolving the pre-polymer in the organic solvent to obtain a polymer solution;

soaking the carbon nanotube film structure with the pre-polymer solution, wherein the carbon nanotube structure is a free-standing structure while in the pre-polymer solution; and polymerizing the pre-polymer infiltrated into the carbon nanotube film structure to obtain a polymer.

19. The method of claim 18, wherein the plurality of carbon nanotubes are arranged substantially along a direction parallel to the planar surface, and joined end-to-end by van der Waals attractive force along the direction.

20. A method for making a composite carbon nanotube structure, comprising:

providing an organic solvent and a polymer;

dissolving the polymer in the organic solvent to obtain a polymer solution; and compositing the polymer with a free-standing carbon nanotube film by applying the free-standing carbon nanotube film in the polymer solution, wherein the free standing carbon nanotube film consists of a plurality of the carbon nanotubes, and has two opposite surfaces parallel with each other, the plurality of carbon nanotubes are substantially parallel to the two opposite surfaces of the free-standing carbon nanotube film, a contact angle between the organic solvent and the carbon nanotubes being less than 90 degrees.

\* \* \* \* \*